Sept. 18, 1962 R. J. HAMMOND 3,054,862

PICKUP CARTRIDGE

Filed April 6, 1959

INVENTOR.
ROBERT J. HAMMOND.
BY
Lockwood, Woodard, Smith & Weikart.
ATTORNEYS.

United States Patent Office 3,054,862
Patented Sept. 18, 1962

3,054,862
PICKUP CARTRIDGE

Robert J. Hammond, Stevensville, Mich., assignor to V-M Corporation, Benton Harbor, Mich., a corporation
Filed Apr. 6, 1959, Ser. No. 804,315
11 Claims. (Cl. 179—100.41)

This invention relates generally to phonograph pickup cartridges and, more particularly, it relates to a pickup cartridge adapted to be used in the Pickup System for Phonographs disclosed in the copending application of Willard J. Faulkner et al., Serial No. 771,412 filed November 3, 1958.

The principal object of this invention is to provide a pickup cartridge adapted to cooperate with a pickup system of the above identified patent application and wherein there is provided a muting switch actuated by the mechanism which elevates the pickup cartridge from the record.

Another object of this invention is to provide a pickup cartridge for cooperation with said pickup system wherein the transducing elements are pivoted on the balance point thereof for rumble reduction and wherein stylus pressure is provided by a compliant spring.

A still further object of this invention is to provide a pickup cartridge having a switch operated by the stylus shifting lever for controlling the connection of either a single channel amplifier for monaural sound reproduction or connecting a second amplifier channel for so-called "stereophonic" sound reproduction.

This invention comprises a pickup cartridge having a casing on which a transducing element such as a crystal structure is pivoted at its balance point and biased by a pressure spring to provide stylus pressure, a stylus cooperating with said transducing element and mounted in a rotatable member having an operating handle whereby the stylus may be rotated for engaging needle members of different size with a record, a switch member mounted on the casing cooperating with said rotatable stylus mounting for automatically connecting either a single amplifier channel to the transducing element or a double amplifier channel to the transducing element, and a lift bracket pivotally attached to said casing and including a muting switch operable to inactivate said transducing element when the lift bracket is actuated to elevate the pickup cartridge away from the record.

The full nature of the invention will be understood from the accompanying drawings and the following description and claims:

Figure 1:
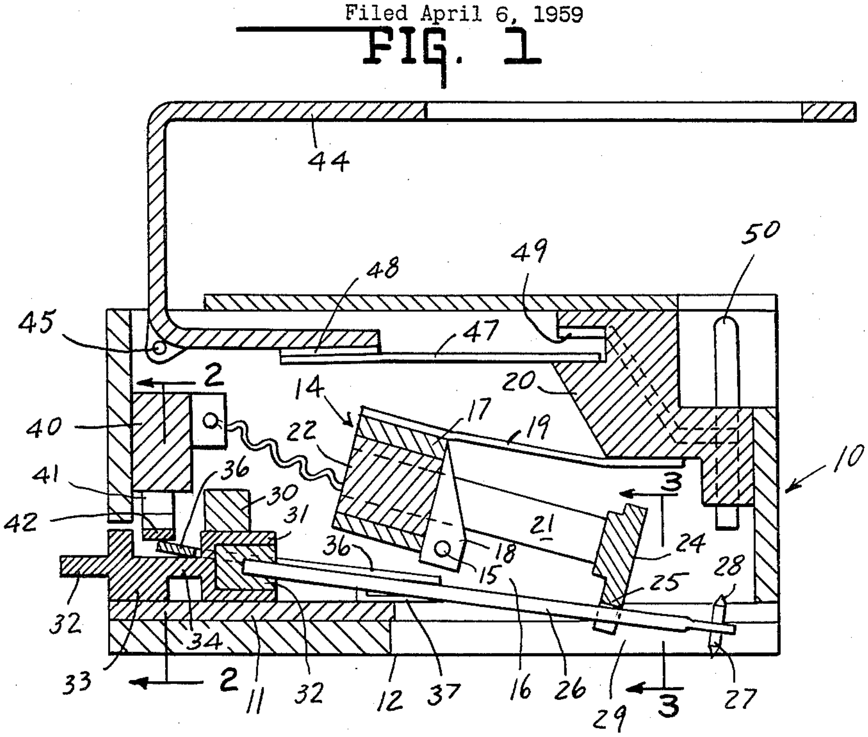
FIG. 1 is a longitudinal cross section of the pickup cartridge provided in accordance with this invention.
Figure 2:
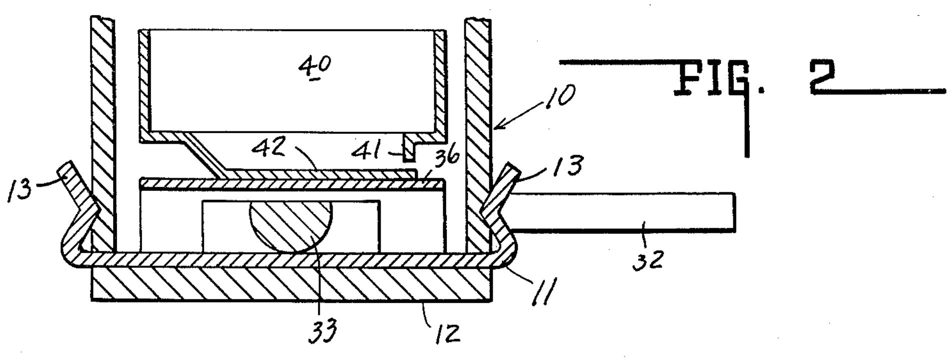
FIG. 2 is a plan view taken on line 2—2 of FIG. 1.
Figure 3:
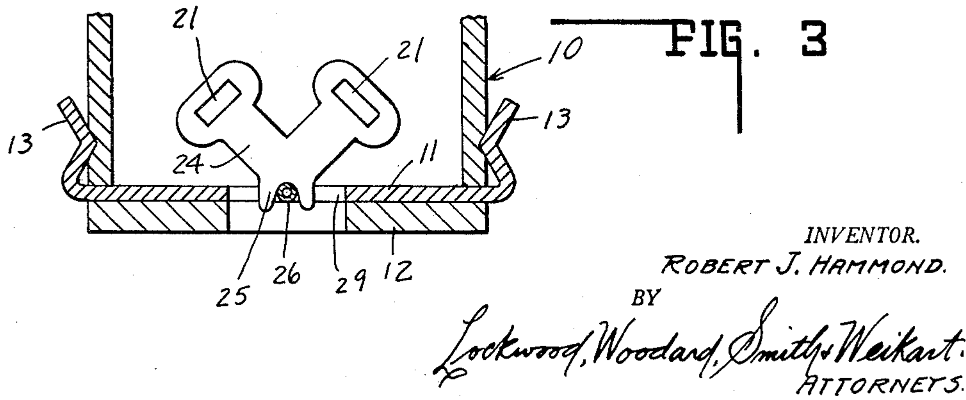
FIG. 3 is a plan view taken on line 3—3 of FIG. 1.

This invention comprises a pickup cartridge having a generally rectangular casing 10, and a removable plate member 11 having a snap-on attachment means 13 and covering the bottom of the casing for mounting a support pad 12 which may be formed of felt or similar material. This pickup cartridge is intended to cooperate with the pickup system disclosed in the copending U.S. patent application previously identified and wherein a flexible hitch or link consisting of a pair of strings or very fine wires are used for maintaining the pickup cartridge in a playing position on a record while the needle tracks the playing groove of the record. Thus, the support pad 12 rides on the record surface while the record is being played.

The pad 12 must meet several fundamental requirements in order to provide the necessary mechanical and acoustical characteristics. The compliance and damping of pad 12 must be such that the crystal member 21 will be supported a predetermined distance above the record surface without producing objectionable resonance effects. Since records unavoidably collect small particles of dust or other foreign matter, the point-contact compliance of the pad must be sufficiently high that the crystal 21 will not be affected when dust or other foreign matter accumulates between the pad and the record surface. Also the compliance of the pad must be such that the irregular surface within the record groove will not cause vibration of the crystal and consequent generation of spurious signals. A material such, for example, as relatively soft rubber, coated with textured Teflon, has been found to provide a pad having the characteristics outlined above. This sort of material is self-cleaning and prohibits sufficient accumulation of dust or other foreign materials which would affect crystal performance. Also, the coefficient of friction between the pad and the record surface is reduced to a minimum.

A transducing element or assembly 14 may be pivotally mounted as at 15 in a vertical wall 16 of casing 10. There is provided a housing member 17 having a bracket extension 18 for receiving a pivoting screw at 15. Housing 17 is spring-biased by a leaf spring member 19 attached to a block member 20 suitably fastened in one corner of casing 10 as illustrated. The housing 17 may be attached to the free end of spring 19 by any suitable means. The spring is intended to provide stylus pressure and, therefore, is highly compliant and tensioned to exert clockwise rotational force on housing 17 whereby housing 17 has a tendency to rotate in a clockwise direction around pivot 15. Transducer member 14 also includes a pair of crystal members 21 secured within housing 17 by means of suitable pad structure 22 in accordance with conventional practice. The crystals 21 support a yoke member 24 at their free ends for engaging at its forked end 25 a stylus member 26 having a pair of oppositely disposed record engaging needles 27 and 28.

Bracket 18 is provided with a hole at 15 located at the balancing point of the entire transducer member 14. Since the entire transducer member 14 is balanced about the pivot 15, it is apparent that no appreciable stresses will occur in the crystals 21 when the transducer member or assembly are moved simultaneously through an equal distance in the same direction. For example, it may be assumed that if the record undergoes vibration caused by phonograph drive motor vibration, such vibration would be transmitted through the pad 12 to the casing 10 and the pivot 15. During any given cycle of vibratory motion the entire assembly consisting of the casing 10, pivot 15, crystals 21, yoke 24, stylus 26 and needle 27, would move through an equal amplitude and in the same direction. Thus, there would not be any resultant stress on crystals 21, and the record vibration would not be transmitted as an electrical signal. Similarly, vibration created by other sources in any given plane would not have any appreciable effect on the output of the crystals, and feedback or rumble effects would not be reproduced to an audible degree.

Stylus 26 extends through slot 29 in plate 11 and pad 12 and is rotatably mounted in a bearing block 30 fixed in any suitable manner to casing 10 for rotatably supporting a cylindrical bearing 31, within which is mounted the end of stylus 26. For this purpose there is provided a block 32 of rubber-like material. The bearing member 31 is rotated by means of a handle member 32 integrally connected therewith by means of a cam member 33 having a reduced extension 34. For maintaining the stylus 26 in position to engage either the needle 27 or the needle 28 with the record, there is provided a bias spring 36 fastened to the pad supporting plate 11 at 37.

An amplifier control switch is mounted in a block 40 attached in turn to casing 10, the switch comprising a stationary contact member 41 and a movable leaf spring contact 42. Cam 33 moves spring 42 into engagement with contact 41 when the switch handle 32 is rotated through an angle of 180°. In this manner the switch consisting of contact 41 and spring 42, may be used in a manner well known in the art to connect and disconnect a second amplifier channel when it is desired to reproduce so-called stereophonic records.

A lift bracket 44 may be pivotally mounted as at 45 to the vertical wall of casing 10 for lifting the cartridge away from the record during a record changing cycle. In order to disconnect the transducer element from the amplifier circuit there is provided a muting switch consisting of a spring contact 47 fastened to the lifting bracket 44 at 48 and extending into alignment with a stationary contact 49 which may be in the form of a conductive strip having electrical connection with one of a plurality of terminal pins 50 mounted in the block 20. As is well known in the art, the terminal pins 50 may be soldered or otherwise connected to conductors leading to one or more amplifier channels.

In operation, the pickup cartridge assembly illustrated in FIG. 1 is lowered into engagement with the record surface as disclosed in the previously mentioned application for United States Letters Patent, Serial No. 771,412, thereby to engage, for example, needle 27 with the playing groove of a record. It may be assumed that the needle 27 is intended to cooperate with records having a playing groove cut in such a manner as to reproduce binaural or stereophonic sound. Needle 27 is biased into contact with the record groove by means of the spring 19 which tends to rotate the transducing assembly 14 in a clockwise direction. The spring 19 is sufficiently compliant and tensioned to cause needle 27 to engage the record groove with the proper degree of pressure.

After one side of a record has been played the record changer mechanism causes the pickup cartridge to be elevated out of contact with the record surface. The lifting forces are effective on the lift bracket 44 whereby the casing 10 will rotate through a few degrees in a clockwise direction about the pivot 45. This causes the spring contact 47 to move into contact with the stationary contact 49 to cause muting of the sound reproducing system, either by disconnecting the crystals 21 from the amplifier circuit or by grounding the crystal output.

If a different record is to be played during the next playing cycle of the phonograph such, for example, as a monaural record, the needle 28 may be rotated into position to engage the record groove by rotating handle 32. Since this also causes rotation of the cam member 33, contact 42 will be moved into engagement with contact 41, thereby to switch the output of crystal 21 into a single amplifier channel for reproduction of monaural sound. Thus, the pickup cartridge is conditioned for playing a monaural record in the same manner as previously described in connection with the playing of a stereophonic record. It will be noted that when the pad 12 engages the surface of the next record to be played, the lifting bracket 44 will rotate about pivot 45 in a clockwise direction to a degree sufficient to separate spring contact 47 from contact 49, thereby to open the muting switch.

The invention claimed is:

1. A pickup cartridge comprising a casing, a stylus having oppositely disposed needles of different sizes at one end thereof, a rotatable member mounted on said casing and extending outwardly thereof and supporting said stylus whereby the stylus may be rotated for engaging one or the other of said needle members with a record, a transducing element pivotally mounted at its balance point on said casing above said stylus and engaging said stylus for operation thereby, a pressure spring secured to said casing and said transducing element for imparting rotational force to said transducing element in a direction to create pressure on said stylus, a switch member mounted on the casing adjacent to said rotatable stylus supporting member, said stylus supporting member including cam means operatively engaging said switch for automatically opening or closing said switch member when said stylus is rotated, a muting switch supported on said casing, and a lift bracket pivotally attached to said casing and including a member operatively engaging said muting switch for operating it when the lift bracket is actuated to elevate the pickup cartridge from the record.

2. A pickup cartridge comprising a casing, a stylus having oppositely disposed needles of different sizes at one end thereof, a rotatable member mounted on said casing and extending outwardly thereof and supporting said stylus whereby the stylus may be rotated for engaging one or the other of said needle members with a record, a transducing element mounted on said casing above said stylus and engaging said stylus for operation thereby, a switch member mounted on the casing adjacent to said rotatable stylus supporting member, said stylus supporting member including cam means operatively engaging said switch for automatically opening or closing said switch member when said stylus is rotated, a muting switch supported on said casing, and a lift bracket pivotally attached to said casing and including a member operatively engaging said muting switch for operating it when the lift bracket is actuated to elevate the pickup cartridge from the record.

3. A pickup cartridge comprising a casing, a stylus mounted on said casing, a transducing element mounted on said casing above said stylus and engaging said stylus for operation thereby, a muting switch supported on said casing, and a lift bracket pivotally attached to said casing and including a member operatively engaging said muting switch for operating it when the lift bracket is actuated to elevate the pickup cartridge from the record.

4. A pickup cartridge comprising a casing, a stylus having oppositely disposed needles of different sizes at one end thereof, a rotatable member mounted on said casing and extending outwardly thereof and supporting said stylus whereby the stylus may be rotated for engaging one or the other of said needle members with a record, a transducing element mounted on said casing above said stylus and engaging said stylus for operation thereby, and a switch member mounted on the casing adjacent to said rotatable stylus supporting member, said stylus supporting member including cam means operatively engaging said switch for automatically opening or closing said switch member when said stylus is rotated.

5. A pickup cartridge comprising a casing, a stylus mounted on said casing, a transducing element pivotally mounted at its balance point on said casing above said stylus and engaging said stylus for operation thereby, and a pressure spring secured to said casing and said transducing element for imparting rotational force to said transducing element in a direction to create pressure on said stylus.

6. A pickup cartridge comprising a casing, a stylus having oppositely disposed needles of different sizes at one end thereof, a rotatable member mounted on said casing and extending outwardly thereof and supporting said stylus whereby the stylus may be rotated for engaging one or the other of said needle members with a record, a transducing element pivotally mounted at its balance point on said casing above said stylus and engaging said stylus for operation thereby, a pressure spring secured to said casing and said transducing element for imparting rotational force to said transducing element in a direction to create pressure on said stylus, and a switch member mounted on the casing adjacent to said rotatable stylus supporting member, said stylus supporting member including cam means operatively engaging said switch for automatically opening or closing said switch member when said stylus is rotated.

7. A pickup cartridge comprising a casing, a stylus mounted on said casing, a transducing element pivotally mounted at its balance point on said casing above said stylus and engaging said stylus for operation thereby, a pressure spring secured to said casing and said transducing element for imparting rotational force to said transducing element in a direction to create pressure on said stylus, a muting switch supported on said casing, and a lift bracket pivotally attached to said casing and including a member operatively engaging said muting switch for operating it when the lift bracket is actuated to elevate the pickup cartridge from the record.

8. A pickup cartridge comprising a casing, a stylus having a plurality of needles at one end thereof, stylus shifting means operatively associated with said stylus for engaging one or the other of said needles with a record, a transducing element mounted on said casing in engagement with said stylus for operation thereby, and a switch member mounted on the casing adjacent to said stylus shifting means, said stylus shifting means including means operatively engaging said switch for automatically opening or closing said switch member when one or the other of said needles is engaged with a record.

9. A pickup cartridge comprising a casing, a stylus mounted on said casing, a transducing element mounted on said casing in engagement with said stylus for operation thereby, a muting switch supported on said casing, and a cartridge lifting means movably mounted on said casing and including a member coupled with said muting switch for operating it when the lifting means is actuated to elevate the pickup cartridge from the record.

10. A pickup cartridge comprising a casing, a stylus mounted on said casing, a transducing element operatively associated with said stylus and attached at its balance point on said casing for movement with respect to said casing, and means coupled between said casing and said transducing element for imparting a force to said transducing element in a direction to create pressure on said stylus.

11. A pickup cartridge comprising a casing having a portion for supporting said cartridge in sliding engagement with the surface of a phonograph record, and a transducing element pivotally mounted at its balance point on said casing, said transducing element including a stylus disposed for engagement with the playing groove of said record when the cartridge is supported on the surface of said record.

References Cited in the file of this patent

UNITED STATES PATENTS

| | | |
|---|---|---|
| 2,174,692 | Dunning | Oct. 3, 1939 |
| 2,773,692 | Dunnavan | Dec. 11, 1956 |
| 2,775,460 | Shivack | Dec. 25, 1956 |

FOREIGN PATENTS

| | | |
|---|---|---|
| 686,777 | Great Britain | Jan. 28, 1953 |